United States Patent [19]

Watanabe et al.

[11] 4,306,142
[45] Dec. 15, 1981

[54] OPTICAL MODULATION DEVICE

[75] Inventors: Isao Watanabe, Amagasaki; Satoshi Komurasaki, Himeji, both of Japan

[73] Assignee: Mitsubishi Denki Kabushiki Kaisha, Tokyo, Japan

[21] Appl. No.: 96,164

[22] Filed: Nov. 20, 1979

[30] Foreign Application Priority Data

Nov. 22, 1978 [JP] Japan .............................. 53-145898

[51] Int. Cl.³ .............................................. G01J 1/20
[52] U.S. Cl. ..................................... 250/201; 350/384
[58] Field of Search ............... 250/201, 204, 209, 216, 250/225, 205; 350/150, 157

[56] References Cited

U.S. PATENT DOCUMENTS

| 3,780,296 | 12/1973 | Waksberg et al. | 350/157 |
| 4,071,751 | 1/1978 | Waksberg | 250/201 |
| 4,158,131 | 6/1979 | Probst | 250/204 |

Primary Examiner—David C. Nelms
Attorney, Agent, or Firm—Wenderoth, Lind & Ponack

[57] ABSTRACT

The disclosed device comprises two duty ratio detectors for detecting respective duty ratios of an input modulation signal modulating an incoming light beam and a modulated intensity-of-light signal proportional to an intensity of an outgoing light beam, a differential amplifier for producing a difference between both duty ratios, and a bias control for supplying this difference to an optical modulator through a bias amplifier.

3 Claims, 6 Drawing Figures

OPTICAL MODULATION DEVICE

BACKGROUND OF THE INVENTION

This invention relates to an optical modulation device utilizing the electrooptic effect.

In recent years there have been increased cases where optical signals are handled which are prepared by modulating the light beam such as a laser beam with a high frequency signal. For example, such optical signals have been and are utilized in recording on video discs, PCM (which is abbreviated for "pulse code modulation") audio discs etc. Optical modulators for modulating the light beam with a high frequency signal are sorted into what utilizes the electrooptic effect and is called hereinafter an "EO type optical modulator" and what utilizes the diffraction of light by an ultrasonic wave and is called hereinafter an "AO type optical modulator". The EO type optical modulator has a wide operating band and a power resistance but has been disadvangeous in that it has a very large drift to make its use difficult. On the other hand, the AO type optical modulator is small in drift and easily handled but has the disadvantages that it has a narrow operating band and lacks in power resistance.

For recording ultra-high density information on video discs or the like, the wide operating band is generally indispensable. For this reason, the EO type optical modulator has been previously, in many cases employed although it is very large in drift and difficult to be used.

Conventional optical modulation devices employing the EO type optical modulator have been usually constructed so that the differential amplifier produces a difference signal between a reference signal representing a proper bias level and a comparison signal representing the modulated state and supplies the difference signal to the optical modulator thereby to control a drift of a bias level due to, for example, a variation in temperature.

However, those conventional devices have been required to include an expensive beam splitter and an expensive optical detector at each of the entrance and exit of the optical modulator. This has resulted in the disadvantages that the overall cost is increased and time and labor is required to set the optical axis of the optical modulator to the optical axes of its components. Also in such conventional devices, a bias supplied to the optical modulator has been controlled so that a duty ratio is of 50% at the level of the mean value of a modulated intensity-of-light signal. This means that conventional optical modulation devices have been subjected to such a limitation that the duty ratio be of 50% at the level of the mean value of the modulated intensity-of-high signals.

Accordingly, it is an object of the present invention to provide a new and improved optical modulation device capable of controlling a bias applied to an optical modulator involved by a single optical detector alone.

It is another object of the present invention to provide a new and improved optical modulation device for modulating a light beam at a proper bias even though a duty ratio has any value at the level of the mean value of a modulated intensity-of-light signal.

SUMMARY OF THE INVENTION

The present invention provides an optical modulation device comprising an optical modulator for modulating an incoming light beam in accordance with an input modulation signal, an optical detector for producing, from a modulated optical output from the optical modulator, an intensity-of-light signal proportional to an intensity of the modulated optical output, a first and a second duty ratio detector for detecting duty ratios of the input modulation signal and the intensity-of-light signal from the optical detector, respectively, a differential amplifier for producing a difference signal between outputs from the first and second duty ratio detectors, and a bias amplifier for applying the difference signal from the differential amplifier to the optical modulator.

Preferably each of the first and second duty ratio detectors may include a voltage comparator for comparing an input signal with a reference signal to deliver a binary voltage signal and a low-pass filter connected to the voltage comparator.

Alternatively, each of the first and second duty ratio detectors may include a positive inversion circuit for delivering an input signal as intact and a signal inverted therefrom, a pair of low-pass filters having the input signal and the inverted signal applied thereto from the positive inversion circuit respectively, and a differential amplifier having applied thereto outputs from the pair of low-pass filters.

BRIEF DESCRIPTION OF THE DRAWINGS

The present invention will become more readily apparent from the following detailed description taken in conjunction with the accompanying drawings in which.

Throughout FIGS. 2, 3 and 4 like reference numerals designate the identical or corresponding components.

DESCRIPTION OF THE PREFERRED EMBODIMENTS

While a Japanese book entitled "Laser Handbook" published by Asakura Bookstore and others describe in detail, the fundamental structure and operational principles of EO type optical modulators utilizing the electrooptic effect a conventional EO type optical modulation device will now be described in conjunction with FIGS. 1A, 1B, 1C and 2.

Figure 1A:
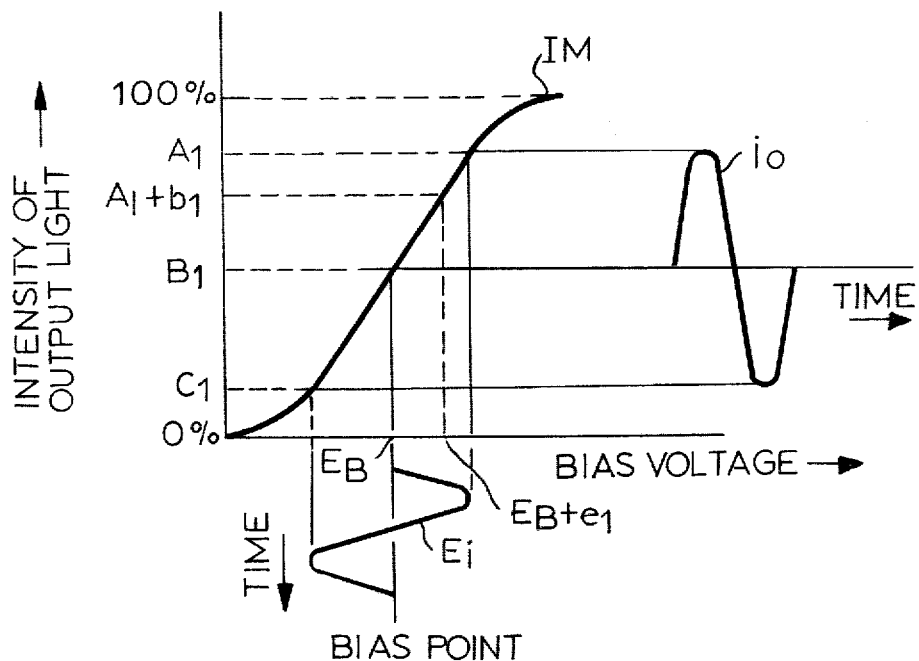
FIG. 1A is a graph illustrating the modulation characteristic of an optical modulator utilizing the electrooptic effect and waveforms of a modulation signal and a modulated intensity-of-light signal developed from the optical modulator having a proper bias.
Figure 1B:
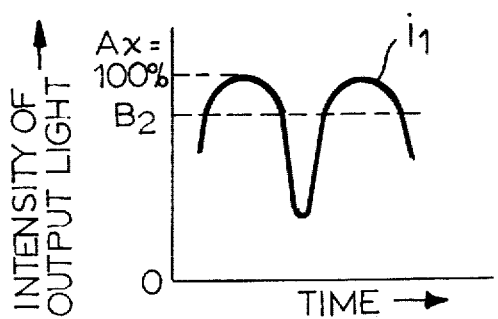
FIG. 1B is a graph illustrating a waveform of a modulated intensity-of-light signal developed when a bias deviates to be higher than the proper bias.

In FIG. 1A there is typically shown the modulation characteristic of EO type optical modulators with reference to both the axis of ordinates representing an intensity of output light and the axis of abscissas representing a bias voltage. Also FIG. 1A shows on the righthand portion a waveform of a modulated intensity-of-light signal $i_o$ properly modulated with a modulation signal $E_i$ whose waveform is illustrated on the lower portion thereof.

In FIG. 1A it is seen that an output light beam has an intensity $B_1$ at a bias voltage $E_B$ and an intensity $(B_i+b_i)$ at a bias voltage $(E_B+e_i)$. Therefore, with a sinusoidal modulation signal $E_i$ supperposed on the bias voltage $E_B$, the intensity of the output light beam varies between an upper limit $A_1$ and a lower limit $C_1$ about the intensity $B_1$ resulting in a modulated intensity-of-light signal $i_o$. As well known, the modulation characteristic labelled the reference characters IM of optical modulators follows the square-of-sine law and therefore when a bias point also designated by the reference characters $E_B$ is one-sided, the resulting modulated intensity signal is distorted in waveform. For example, with the bias point $E_B$ displaced to a higher value, the waveform of the resulting modulated intensity signal is distorted substantially as illustrated at waveform $i_1$ in FIG. 1B wherein the axis of ordinates represents an intensity of an output light beam and the axis of abscissas represents time. On the other hand, with the bias point $E_B$ displaced to a lower value, the resulting waveform $i_2$ is shown in FIG. 1C wherein the axes of ordinates and abscissas have the same meanings as those in FIG. 1B.

Figure 1C:
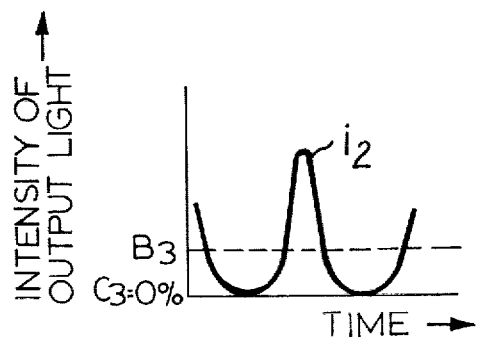
FIG. 1C is a graph similar to FIG. 1B but illustrating a bias deviating to be less than the proper bias.

The modulated intensity signal i has the mean value of $B_1$ at the bias point $E_B$ (see FIG. 1A), of $B_2$ which is larger than the $B_1$ at the higher bias point (see FIG. 1B) and of $B_3$ which is smaller than the $B_1$ at the lower bias point (see FIG. 1C). In this way, the mean value of the modulated intensity signal i varies with the bias voltage. With a 100% modulation effected at the proper bias, or with a modulation effected so that the upper and lower points $A_1$ and $C_1$ shown in FIG. 1A correspond to 100% and 0% of the modulation, the resulting mean value $B_1$ ammounts to 50% of the maximum intensity of the output light beam.

Conventional bias control devices have utilized the characteristics as described above in conjunction with FIGS. 1A, 1B and 1C.

Figure 2:
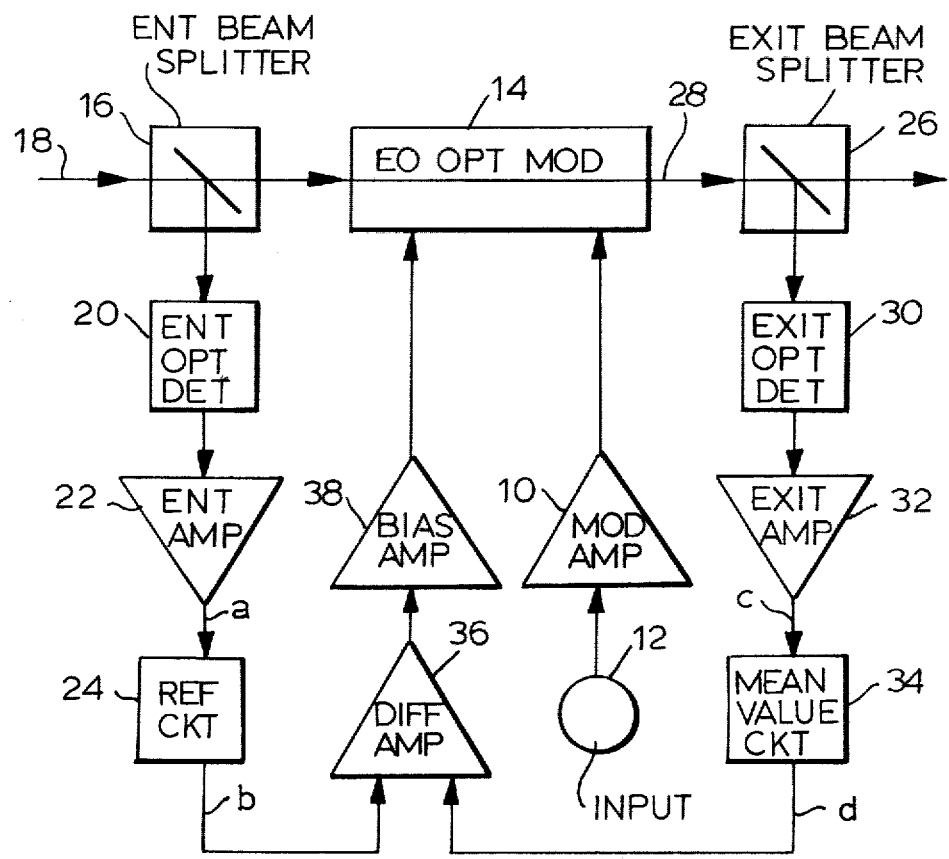
FIG. 2 is a block diagram of a conventional optical modulation device.

Referring now to FIG. 2, there is illustrated a conventional EO type optical modulation device including such a bias control device. The arrangement illustrated comprises a modulation amplifier 10 for supplying a modulation signal from an input terminal 12 to an EO type optical modulator 14, an entrance beam splitter 16 disposed at the entrance of the optical modulator 14 to split an incoming light beam 18 into two split portions of the light beam, and an entrance optical detector 20 receiving one of split light beam portions from the entrance beam splitter 16.

The entrance optical detector 20 is electrically connected to an entrance amplifier 22 subsequently connected to a reference circuit 24.

The arrangement further comprises an exit beam splitter 26 disposed at the exit of the optical modulator 14 to split an outgoing light beam 28 leaving the optical modulator 14 into two portions of the light beam and an exit optical detector 30 receiving one of the split light beam portions from the exit beam splitter 26.

The exit optical detector 30 is electrically connected to an exit amplifier 32 subsequently connected to a mean value circuit 34.

Then the reference circuit 24 includes an output connected to one input to a differential amplifier 36 while the mean value circuit 34 includes an output connected to the other input to the differential amplifier 38. The differential amplifier 36 is connected to the optical modulator 14 through a bias amplifier 38.

In the arrangement of FIG. 2 it is noted that each of the electric components or circuits is DC-coupled to the adjacent electric components or circuits.

The operation of the arrangement shown in FIG. 2 will now be described. The entrance beam splitter 16 splits the incoming light beam 18 so as to apply the greater part thereof to the optical modulator 14 and supply the remaining part thereof to the entrance optical detector 20. The optical detector 20 detects the split incoming light beam portion and converts it to a corresponding electrical signal. The entrance amplifier 22 amplifies the electric signal from the optical detector 20 to deliver an output to the reference circuit 24 which, in turn, supplies a signal b having a level equal to one half that of the output a applied thereto to the one input to the differential amplifier 36.

The greater part of the incoming light beam 18 from the entrance beam splitter 16 is applied to the optical modulator 14 as described above and modulated with the modulation signal from the modulation amplifier 10 to form an outgoing light beam 28 as will be described later.

The outgoing light beam 28 is split by the exit beam splitter 26 into the greater part thereof forming an output from the arrangement of FIG. 2 and a smaller part thereof directed to the exit optical detector 30. The exit optical detector 32 detects the split outgoing light beam portion and converts it to a corresponding electrical signal. The exit amplifier 32 amplifies the electrical signal from the optical detector 30 and delivers an output C to the mean value circuit 34. The mean value circuit 34 delivers to the other input to the differential amplifier 36 an output signal d put at the level of the mean value of the outgoing light beam 28 which is formed of a high frequency signal modulated by the optical modulator 14 during its passage therethrough.

The differential amplifier 36 amplifies a difference signal between the output b from the reference circuit 24 and the output d from the mean value circuit 34 and supplies the amplified difference signal to the bias amplifier 38. The bias amplifier 38 amplifies the amplified difference signal to the required level after which the signal thus amplified is supplied, as a bias voltage to the optical modulator 14.

The modulation signal is applied to the input terminal 12 and then amplified by the modulation amplifier 10 after which it is supplied to the optical modulator 14. It is assumed that the incoming light beams portion is free from any loss during its passage through the optical modulator 14 and that the optical modulator 14 effects the 10090 modulation so that $A_1=100\%$ and $C_1=0\%$ hold in FIG. 1A. Under the assumed conditions, the incoming light beam portion is modulated with the modulation signal from the input terminal 12 about a bias point following the difference signal delivered from the differential amplifier 36. Thus the incoming light beam 18 is converted to the outgoing light beam 28 subjected to the high frequency modulation.

As described above, the modulated intensity-of-light signal has the mean value $B_1$ equal to one half the maximum intensity of output light as long as the proper bias voltage is supplied to the optical modulator 14. This is apparent from the illustration of FIG. 1A wherein $A_1=100\%$ and $C_1=0\%$ hold, and provides a basis on which the bias control is effected.

More specifically the output a from the entrance amplifier 22 has a signal level representing the intensity of the incoming light beam 18 and the output b from the reference circuit 24 has a signal level equal to one half the signal level of the incoming light beam 18. The signal level of this output is identical to the level of the mean value of the modulated intensity signal obtained at the proper bias and provides a reference for the bias control.

On the other hand, the output C from the exit amplifier 32 is formed of a high frequency signal obtained by detecting the outgoing light beam 28 by the exit optical detector 30. This high frequency signal has the level of the mean value determined by the mean value circuit 34. Thus the output d from the mean value circuit 34 is a signal representing the mean value of the high frequency signal. Without the bias control effected, the level of the mean value is designated by the $B_2$ or $B_3$ shown, by way of example, in FIG. 1B or 1C. The output signal d from the mean value circuit 34 forms a comparison signal for the reference signal b that is the output from the reference circuit 24.

Then the differential amplifier 36 produces a difference signal between the reference signal b representing the proper bias level and the comparison signal d representing the modulated state and supplies this difference signal to the optical modulator 14 through the bias amplifier 36 thereby to permit the control of a drift of a bias point due to, for example, a variation in temperature. As a result, the stabilized modulated intensity-of-light signal can be always produced.

However, conventional devices such as shown in FIG. 2 have been required to include the beam splitter and the optical detector disposed at each of the entrance and exit of the optical modulator 14 resulting in the disadvantages that (1) the devices become expensive because the beam splitters and optical detectors required therefor are expensive and (2) it is difficult to set the optical axis of the optical modulator with the optical axes of these components which requires fairly time and labor.

Also in the arrangement of FIG. 2, a bias applied to the optical modulator has been controlled so that the duty ratio is of 50% at the level of the mean value of the modulated intensity signal. In other words, the arrangement has been subjected to such a limitation that the duty ratio is of 50% at the level of the mean value of the modulated intensity signal. A figure of 50% imparted to the duty ratio may be more or less varied in the static manner, but when the modulated intensity-of-light signal has that figure changing every hour, the bias has been disadvantageously unabled to be controlled to a proper magnitude.

The present invention contemplates to provide a new and improved optical modulation device requiring only a single optical detector system and free from the disadvantage that the duty ratio at the level of the mean value of the modulated intensity signal is restricted to 50%.

Figure 3:
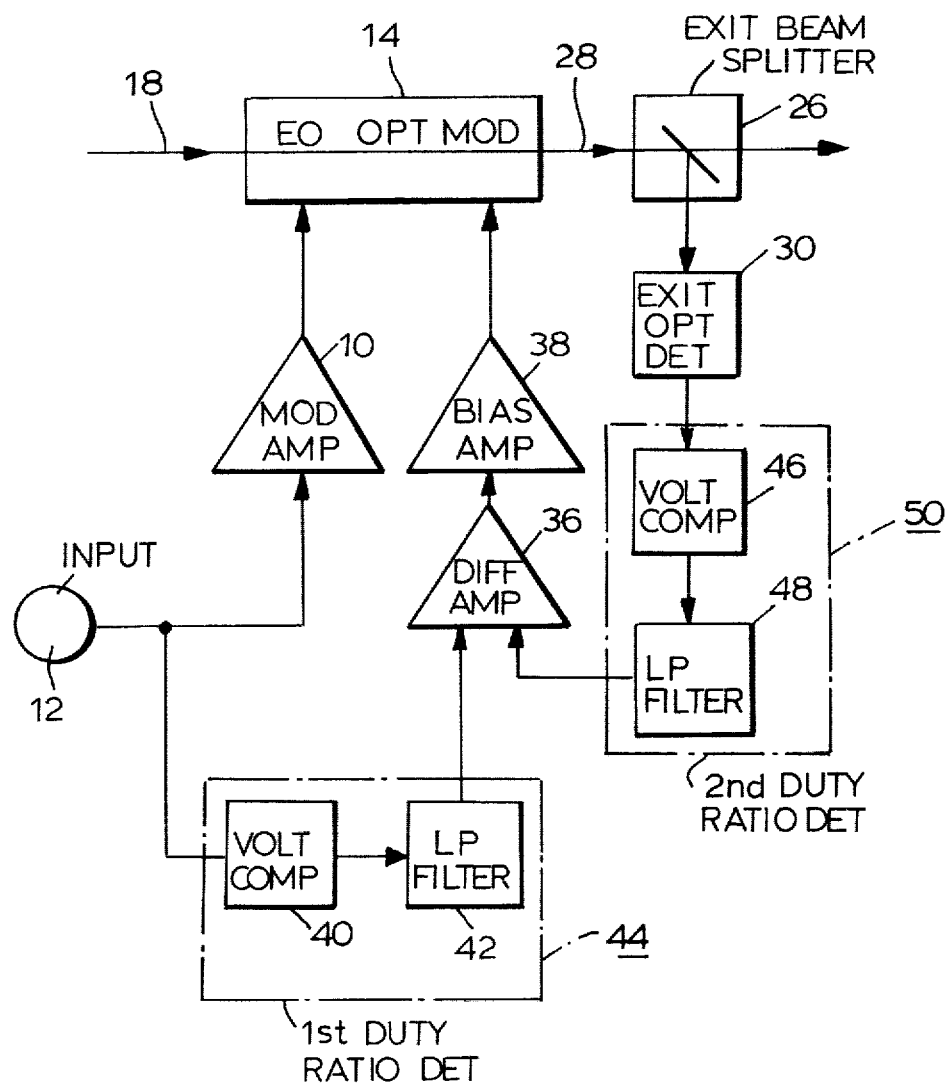
FIG. 3 is a block diagram of one embodiment according to the optical modulation device of the present invention.

Referring now to FIG. 3, there is illustrated one embodiment according to the optical modulation device of the present invention. In the arrangement illustrated the beam splitter 16 disposed at the entrance of the optical modulator 14 and the associated components 20, 22 and 24 are omitted and instead an input voltage comparator 40 includes an input connected to the input terminal 12 and an output connected to an input low-pass filter 42 subsequently connected to one input to the differential amplifier 36. The input voltage comparator 40 and the input low-pass filter 42 form a first duty-ratio detector generally designated by the reference numeral 44.

At the exit of the optical modulator 14 the exit optical detector 30 is connected to an exit voltage comparator 46 but not to the exit amplifier 32. The exit voltage comparator 46 is connected to an input to an exit low-pass filter 48 subsequently connected to the other input to the differential amplifier 36. The exit voltage comparator 46 and the exit low-pass filter 48 form a second duty ratio detector generally designated by the reference numeral 50.

The arrangement illustrated in FIG. 3 is operated as follows: The input voltage comparator 40 compares the input modulation signal from the input terminal 12 with a reference signal to produce a binary voltage signal. The binary voltage signal passes through the input low-pass filter 42 and a duty ratio of the modulation signal is detected at the output of the low-pass filter 42.

Similarly, the exit voltage comparator 46 compares the modulated intensity-of-light signal from the exit optical detector 30 with a reference signal to produce a binary voltage signal which, in turn, passes through the exit low-pass filter 48. A duty ratio of the modulated intensity-of-light signal is detected at the output of the exit low-pass filter 48 as in the low-pass filter 42.

Subsequently, the duty ratios detected by the first and second duty ratio detectors 44 and 50 respectively are supplied to the differential amplifier 36 where a signal representing a difference therebetween is produced. This signal is supplied via the bias amplifier 38 to the optical modulator 14 thereby to control the bias applied to the optical modulator 14 to the proper magnitude so as to render the difference null. Therefore the desired modulated intensity-of-light signal can be stably provided.

Figure 4:
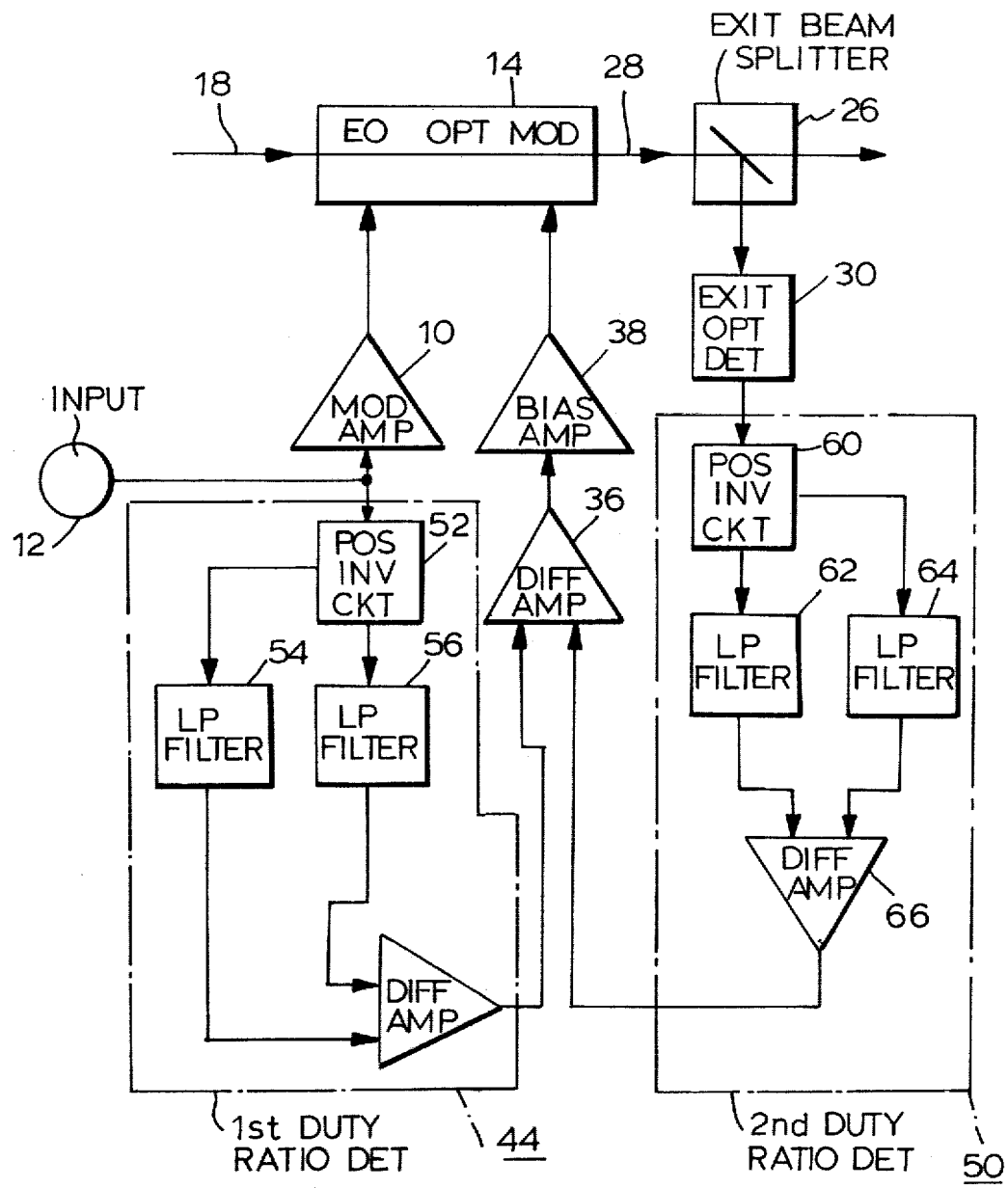
FIG. 4 is a diagram similar to FIG. 3 but illustrating a modification of the present invention.

In the arrangement illustrated in FIG. 4, the first duty ratio detector 44 includes a positive inversion circuit 52 connected to the input terminal 12 to produce input modulation signal as intact a signal inverted therefrom, a pair of low-pass filters 54 and 56 applied with the intact modulation signal and the inverted modulation signal from the positive inversion circuit 50 and a differential amplifier 58 connected to the low-pass filters 54 and 56 to produce a difference signal between outputs therefrom.

The second duty ratio detector 50 includes similarly a positive inversion circuit 60, connected to the exit optical detector 30, a pair of low-pass filters 62 and 64 and a differential amplifier 66 identical to the corresponding components as described above in conjunction with the first duty ratio detector 44.

The differential amplifiers 58 and 68 are connected to both inputs to the differential amplifier 36.

The arrangement of FIG. 4 is substantially identical in operation to that shown in FIG. 3 but the former is advantageous over the latter in that a sensitivity of sensing an error is doubled as compared with the latter because each of the first and second duty ratio detectors includes the positive inversion circuit, a pair of low-pass filters and the differential amplifier and that drifts of outputs from the voltage comparators 52 and 60 can offset each other because the duty ratio detectors are symmetric with respect to the input and output sides of the optical modulator. Therefore the entire system increases in stability.

From the foregoing it is seen that the present invention provides an optical modulation device comprising a pair of duty ratio detectors for detecting duty ratios of an input modulation signal and a modulated intensity-of-light signal respectively, and a differential amplifier for producing a difference between both duty ratios and an optical modulator having this difference applied thereto through a bias amplifier. Therefore the present invention eliminates the requirement that the duty ratio be restricted to 50% and therefore can effect the optical modulation at a proper bias although the duty ratio would have any value. The present invention is inexpensive because of the elimination of the necessity of disposing expensive components such as the beam splitter, optical detector etc. at the entrance of the optical modulator. Also it is not required to set the optical axes of those components to the optical axis of the optical modulator resulting in the simplification of this setting. This is very advantageous with optical modulation devices wherein the optical signal frequentry changes.

While the present invention has been illustrated and described in conjunction with a few preferred embodiments thereof it is to be understood that numerous changes and modufications may be resorted to without departing from the spirit and scope of the present invention. For example, the arrangements illustrated in each of FIGS. 3 and 4 includes various electric components or circuits each DC coupled to the adjacent electric components or circuits but the AC coupling may be used to interconnect those components or circuits which is more convenient. Also while the exit beam splitter is used to take out one portion of the outgoing light beam in the arrangements shown in FIGS. 3 and 4 it is to be understood that the exit beam splitter may receive a light beam discharged from the EO type optical modulator through a beam splitter disposed therein and equal to a difference between the incoming and outgoing light beams and the output from the exit beam splitter is inversed in polarity to form an optical signal which corresponds to the outgoing light beam.

What we claim is:

1. An optical modulation device comprising an optical modulator for modulating an incoming light beam in accordance with an input modulation signal, an optical detector for producing from a modulated optical output from said optical modulator an intensity-of-light signal proportional to an intensity of said modulated optical output, a first and a second duty ratio detector for detecting duty ratios of said input modulation signal and said intensity-of-light signal from said optical detector respectively, a differential amplifier for producing a difference signal between outputs from said first and second duty ratio detectors, and a bias amplifier for applying said difference signal from said differential amplifier to said optical modulator.

2. An optical modulation device as claimed in claim 1 wherein each of said first and second duty ratio detectors includes a voltage comparator for comparing an input signal with a reference signal to produce a binary voltage signal, and a low-pass filter connected to said voltage comparator.

3. An optical modulation device as claimed in claim 1 wherein each of said first and second duty ratio detectors includes a positive inversion circuit for delivering an input signal as intact and a signal inverted therefrom, a pair of low-pass filters having said input signal and said inverted signal applied thereto from said positive inversion circuit respectively, and a differential amplifier having applied thereto outputs from said pairs of low-pass filters.

* * * * *